United States Patent
Risdon et al.

(10) Patent No.: US 6,561,569 B1
(45) Date of Patent: May 13, 2003

(54) DRIVE MECHANISM FOR POWER OPERATED SLIDEABLE SIDE DOOR

(75) Inventors: Bruce J. Risdon, St. Clair Shores, MI (US); David A. Sedlak, Clarkston, MI (US); David J. Chapman, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/223,495

(22) Filed: Aug. 19, 2002

(51) Int. Cl.[7] .................................................. B60J 5/06
(52) U.S. Cl. ......................................... 296/155; 49/360
(58) Field of Search ............................ 296/155; 49/360, 49/352, 348, 349

(56) References Cited

U.S. PATENT DOCUMENTS

| | | |
|---|---|---|
| 4,932,715 A | 6/1990 | Kramer |
| 5,168,666 A | 12/1992 | Koura et al. |
| 5,316,365 A | 5/1994 | Kuhlman et al. |
| 5,906,071 A | 5/1999 | Buchanan, Jr. |
| 6,081,088 A | 6/2000 | Ishihara et al. |
| 6,425,206 B1 * | 7/2002 | Noda et al. |
| 6,430,875 B1 * | 8/2002 | Clark et al. |
| 6,464,287 B2 * | 10/2002 | Rogers, Jr. et al. |
| 6,481,783 B1 * | 11/2002 | Rogers, Jr. et al. |

* cited by examiner

*Primary Examiner*—D. Glenn Dayoan
*Assistant Examiner*—Scott Carpenter
(74) *Attorney, Agent, or Firm*—Kathryn A. Marra

(57) ABSTRACT

A passenger van is equipped with a drive mechanism for power operation of a slideable side door. The drive mechanism has a flexible drive cable that travels in a closed loop that includes cable portions that travel through a center track in opposite directions. The center track supports and guides a roller assembly that is attached to the rear of the side door. The roller assembly carries a cinch mechanism that selectively connects the roller assembly to a portion of the cable that is traveling in one direction to open the sliding door and that selectively connects the roller assembly to a portion of the cable that is traveling in the opposite direction to close the sliding door. The cinch mechanism is normally disconnected from the cable so that the side door can be opened or closed manually very easily.

16 Claims, 2 Drawing Sheets

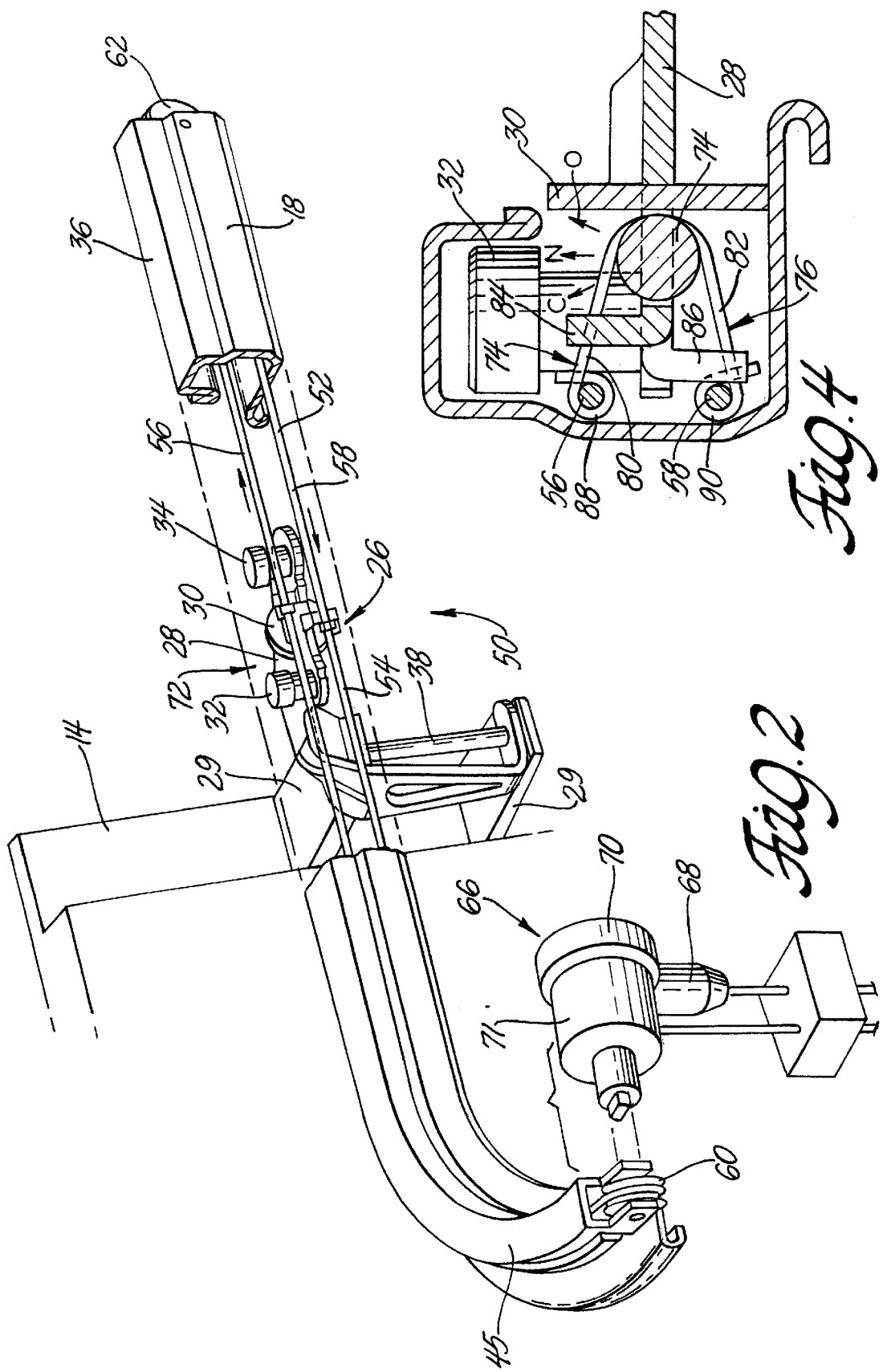

DRIVE MECHANISM FOR POWER OPERATED SLIDEABLE SIDE DOOR

FIELD OF THE INVENTION

This invention relates to automotive vehicles having a slideable side door and more particularly to a drive mechanism for a power operated slideable side door.

BACKGROUND OF THE INVENTION

U.S. Pat. No. 5,316,365 granted to Howard W. Kuhlman and Jeffrey K. Joyner May 31, 1994 discloses a passenger van that has a slidable side door. The door is supported on and slideable in three tracks. A module for power operation of the door is mounted inside the van adjacent to the center track that supports and guides the rear of the door. The module includes a front cable and a rear cable. The front cable is attached to a front cable drive pulley, then extends through a front cable roller guide assembly and is then attached to a roller assembly. The rear cable is attached to a rear cable drive pulley then extends through a rear cable roller guide assembly, and is then attached to the roller assembly. The front and rear cable drive pulleys are driven by a reversible electric motor that is driven in one direction to open the sliding door and in the opposite direction to close the sliding door.

U.S. Pat. No. 4,932,715 granted to Hans Kramer Jun. 12, 1990 discloses a passenger van that has a slidable side door that is opened and closed by a mechanism that includes a roller carriage in a track. The roller carriage and hence the side door is driven by an endless round cable that travels in a closed loop with a strand or portion of the cable being disposed in the track and attached to the roller carriage. The cable is driven by a driving roller which is turn is driven by an electric motor via an electromagnetic clutch. The electric motor is reversible so that the cable is driven in one direction to open the side door and in an opposite direction to close the side door. See also U.S. Pat. No. 5,168,666 granted to Soushichi Koura et al Dec. 8, 1992; and U.S. Pat. No. 6,081,088 granted to Hidenori Ishihara et al Jun. 27, 2000.

Copending Patent Application Ser. No. 09/867,863, filed May 30, 2001, discloses a drive mechanism for power operation of a slideable side door of an automotive vehicle that is characterized by a roller assembly that includes a clutch for clamping onto a flexible drive member that is driven in a loop by a reversible electric motor. To open the side door, the clutch is engaged and the flexible drive member is driven in the loop in one direction. To close the side door, the flexible drive member is driven in the opposite direction. See also copending Patent Application Ser. No. 09/978,908, filed Oct. 16, 2001.

SUMMARY OF THE INVENTION

This invention provides a drive mechanism for power operation of a slideable side door of an automotive vehicle, such as a passenger van.

In one aspect, the drive mechanism has a flexible drive member trained to travel in a loop so that an upper portion of the loop and a lower portion of the loop that travel in opposite directions are disposed in a track juxtaposed a roller assembly that is attached to the side door. A drive mechanism is operatively connected to the flexible drive member to drive the flexible drive member in the loop, and a cinch mechanism is mounted on the roller assembly for connecting the roller assembly to the flexible drive member selectively. The cinch mechanism has an upper clutch for engaging the upper portion of the flexible drive member to drive the side door in one direction, and a lower clutch for engaging the lower portion of the flexible drive member to drive the side door in an opposite direction. Thus the side door can be opened and closed without any need for a reversible electric motor to reverse the travel direction of the flexible drive member.

In another aspect, the drive mechanism has a flexible drive member that is a round cable of uniform diameter and a cinch mechanism for connecting the roller assembly to the round cable of uniform diameter.

BRIEF DESCRIPTION OF THE DRAWINGS

FIG. 2 is a schematic perspective view of the drive mechanism for opening and closing the sliding side door shown in FIG. 1;

FIG. 4 is a section taken substantially along the line 4—4 of FIG. 3 looking in the direction of the arrows with the cincher disengaged.

DESCRIPTION OF THE PREFERRED EMBODIMENT

Figure 1:
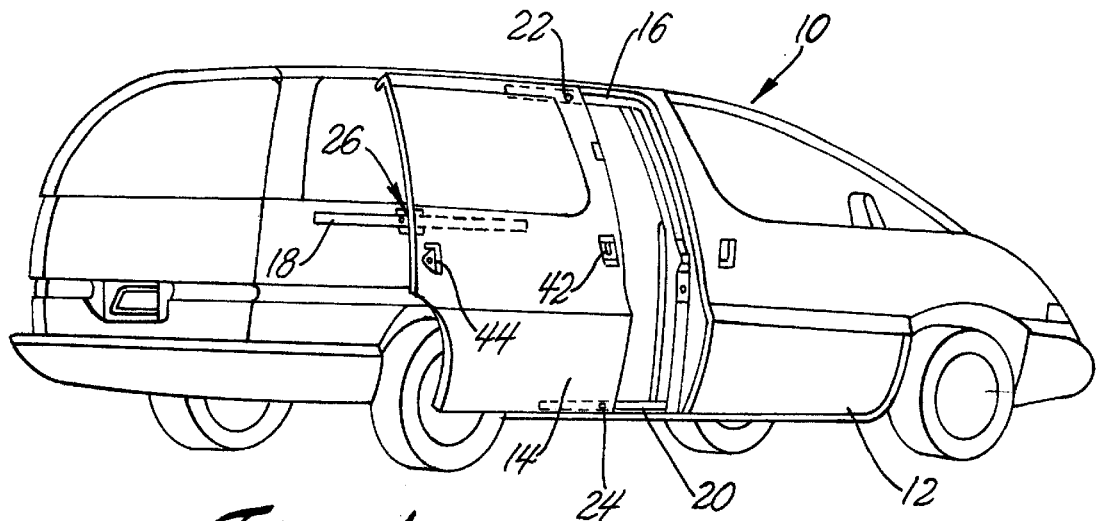
FIG. 1 is a side view of a passenger van equipped with a sliding side door of the invention.

Referring now to FIGS. 1 and 2, an automotive vehicle, such as a passenger van 10 has a hinged front door 12 on each side of the vehicle and at least one sliding side door 14 behind the front doors that may be power driven. Such vehicles are well known and need not be described in detail. See for instance the Kuhlman '365 patent discussed above.

The power sliding door 14 is supported and guided by an upper track 16, a center track 18, and a lower track 20 as shown in FIG. 1. An upper roller assembly 22 is attached to the upper forward corner of the power sliding door and runs in the upper track 16. A lower roller assembly 24 is attached to the lower forward corner of the power sliding door and runs in the lower track 20. A third roller assembly 26 is pivotally attached to the rear portion of the power sliding door 14 between the upper and lower portions of the power sliding door.

Figure 3:
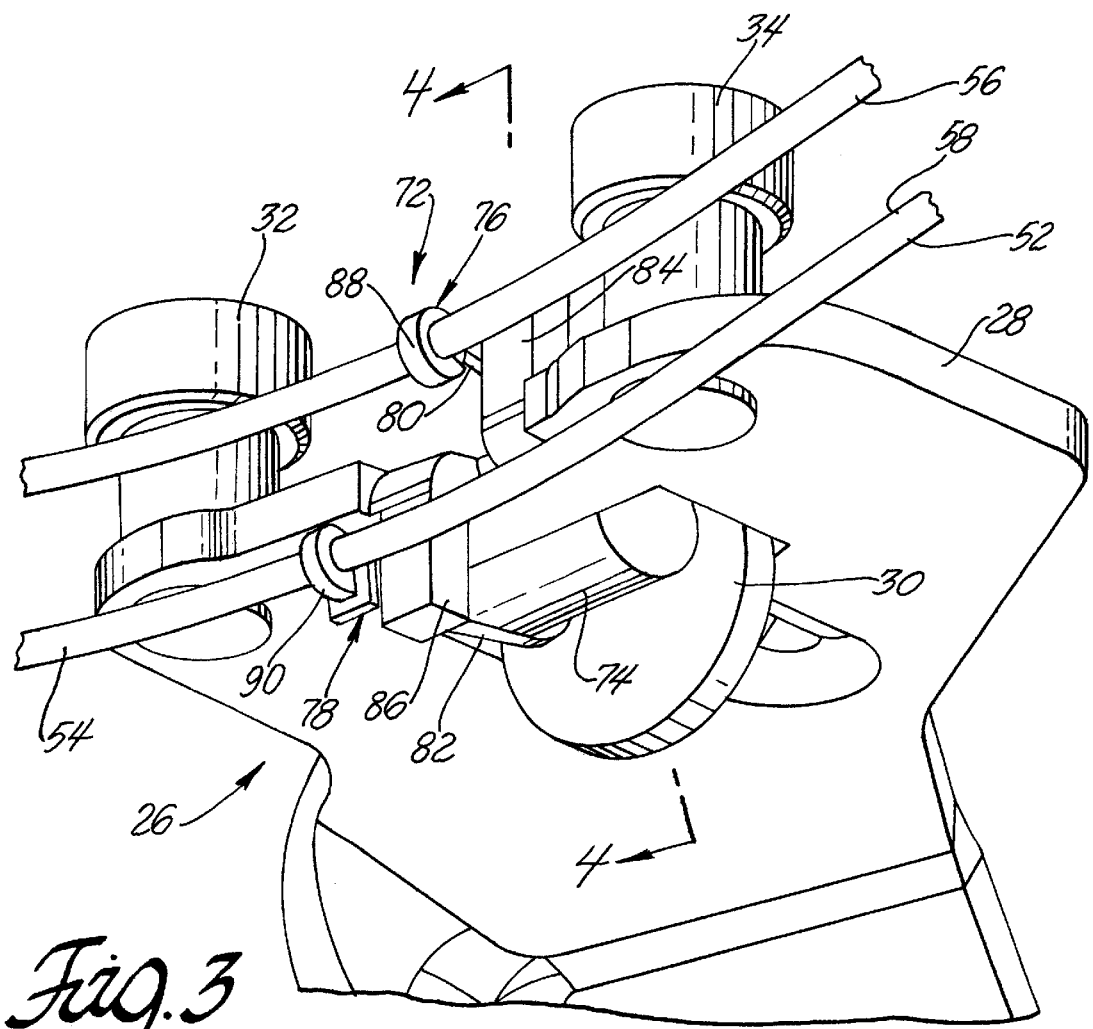
FIG. 3 is an enlarged perspective view of a hinge and roller assembly in the drive mechanism shown in FIG. 2.

Referring now to FIGS. 2 and 3, roller assembly 26 has a carriage 28. A support roller 30 pivotally attached to carriage 28 for rotation about a generally horizontal axis, supports the rear portion of door 14 and runs in the center track 18. Two guide rollers 32 and 34 are pivotally attached to carriage 28 for rotation about generally vertical axes and run in an upper channel portion 36 of the center track 18. A vertical hinge pin 38 passes through a pair of hinge apertures in carriage 28 and through hinge apertures in a bracket 29 attached to the rear edge of the power sliding door 14 to connect carriage 28 to power sliding door 14.

The power sliding door 14 moves horizontally inward toward the center of the van 10 for latching and sealing. Latches 42 and 44 are provided at the front and rear of the power sliding door 14 which moves horizontally inward to compress resilient seals and to latch. Inward horizontal movement of the sliding door 14 is obtained by curving the forward ends of the upper, center and lower tracks 16, 18 and 20 inwardly toward the center of van 10. When the hinge and roller assembly 26 passes around the curved forward end 45 of center track 18, the hinge and roller assembly 26 pivots inwardly and moves the rear portion of side door 14 horizontally inward toward the side of van 10.

The drive mechanism 50 for opening and closing the side door 14 comprises the roller assembly 26 and further includes a flexible drive member 52 that travels in a closed loop with upper and lower portions 56, 58 of the loop disposed in track 18 along the entire length of the track as best shown in FIG. 2. The portions of the loop disposed in track 18 travel in close proximity to the roller assembly 26. Flexible drive member 52 is preferably an endless round cable 54 that has a smooth outer surface.

A front pulley 60 engages the flexible drive member 52 at a front end of track 18 and a rear cable guide 62 engages the flexible drive member 52 at a rear end of the track 18. Cable guide 62 may be stationary as shown or may be a rotatable pulley (not shown). Upper and lower portions 56, 58 of the loop that are disposed inside track 18 run in opposite directions as indicated by the arrows in FIG. 2.

A drive assembly 66 is attached to van 10 in any suitable manner. Drive assembly 66 comprises an electric motor 68 that drives an optional electromagnetic clutch such as clutch 70. Clutch 70 in turn drives front pulley 60 via a gear reduction unit 71. Front drive pulley 60 is configured to drive cable 54 in a loop as best shown in FIG. 2.

The roller assembly 26 includes a cinch mechanism 72 for clamping hinge and roller assembly 26 to either the upper portion 56 of flexible drive member 52 to drive the roller assembly 26 in one direction or to the lower portion 58 to drive the roller assembly 26 in the opposite direction as shown by the arrows in FIG. 2.

Cinch mechanism 72 comprises a drive drum 74 for operating upper and lower clutches 76 and 78 that comprise upper and lower lariats 80 and 82 and upper and lower stops 84 and 86, respectively. Upper lariat 80 has a noose 88 at one end that encircles the upper portion 56 of flexible drive member 52 and that is located adjacent upper stop 84 which may conveniently be formed as a bent tab of carriage 28. The opposite end of lariat 80 is attached to drive drum 74. Lower lariat 82 has a noose 90 at one end that encircles the lower portion 58 of flexible drive member 52 and that is located adjacent lower stop 86 which also may conveniently formed as a bent tab of carriage 28. The opposite end of lariat 82 is also attached to drive drum 74. The opposite ends of lariats 80 and 82 are attached to drive drum 74 at spaced locations so that upper lariat 80 is wound on drum 74 while lower lariat 82 is payed off drum 74 when drive drum 74 is displaced or indexed angularly in one direction. When upper lariat 80 is wound on drum 74, upper portion 56 of flexible drive member 52 is pulled against upper stop 84 and upper noose 88 tightens around and grips the upper portion 56 of flexible drive member 52. The lower noose 90 is simultaneously further loosened on the lower portion 58 of the flexible drive member 52 as lower lariat 82 is payed off drum 74. The opposite happens when drive drum 74 is indexed in the opposite direction, that is, upper lariat 80 is payed off drum 74 and noose 88 is loosened while lower lariat 82 is wound on drum 74 and noose 90 is tightened gripping the lower portion 58 of the flexible drive member 52.

The angularly indexable drive drum 74 has open, neutral and close positions illustrated schematically as O, N and C in FIG. 4. Flexible drive member 52 slides through lariats 80 and 82 when drive drum 74 is in the neutral position so that the side door 14 can be opened or closed manually without any resistance from cinch mechanism 72. To open the side door 14, motor 68 and the optional electromagnetic clutch 70 if one is used are energized and drive drum 74 is indexed (clockwise as shown in FIG. 4) to the open position through suitable controls which are not shown but well within the skill of a person of ordinary skill in the art. The energization of motor 68 and electromagnetic clutch 70 and the indexing of drive drum 74 can occur in any order but the energization preferably occur simultaneously. In any event, the energization causes flexible drive member 52 to travel in a loop in the clockwise direction as viewed and as shown by the arrows in FIG. 2 while indexing drum 74 to the open position causes upper clutch 76 to engage the upper portion 56 of flexible drive member 52 and move the side door 14 from the closed position to the open position, that is, to the right as shown in FIG. 2. As upper noose 88 of upper clutch 76 tightens around the upper portion 56 of flexible drive member 52 to engage the upper clutch 76, the lower noose 90 of lower clutch 80 is simultaneously further loosened from its slipping neutral condition removing any possibility of the lower clutch 80 interfering with the side door 14 traveling to the open position.

To close the side door 14, motor 68 and the optional electromagnetic clutch 70 are energized and drive drum 74 is indexed to the close position. Energization of motor 68 and electromagnetic clutch 70 still causes flexible drive member 52 to travel in a loop in the clockwise direction as viewed FIG. 2. However, indexing drive drum 74 to the close position causes lower clutch 78 to engage the lower portion 58 of flexible drive member 52 and move the side door 14 from the open position to the closed position, that is to the left as shown in FIG. 2. As lower noose 90 of lower clutch 78 tightens around the lower portion 58 of flexible drive member 52 to engage the lower clutch 78, the upper noose 88 of upper clutch 76 is simultaneously further loosened from its slipping neutral condition removing any possibility of the upper clutch 76 interfering with the side door traveling to the closed position. Thus drive mechanism 50 opens and closes side door 14 without any need for reversing the travel of the flexible drive member 52 or the rotation of the electric motor 68. Hence a reversible electric motor is not necessary. It should also be noted that the flexible drive member 52 can take the economical form of a round cable 54 of uniform diameter.

While a specific embodiment has been illustrated, other embodiments are possible. For instance, the electromagnetic clutch 70 can be eliminated for economy. Moreover, while the preferred embodiment is illustrated with a drive pulley 60 and only one cable guide 60 for driving and guiding the flexible drive member 52 additional guides, both stationary and rotary can be used to establish the travel loop for the flexible drive member 52. Furthermore, the parts of the drive mechanism can be rearranged so that the sprocket 60, motor 68 and electromagnetic clutch 70 are at a rear end of track 18. In other words, while a preferred embodiment of the invention has been shown and described, other embodiments will now become apparent to those skilled in the art. Accordingly, the invention is not to be limited to that which is shown and described but by the following claims.

We claim:

1. A drive mechanism for a power operated slideable side door that is attached to a roller assembly that travels in a track of a vehicle comprising:

a flexible drive member trained to travel in a loop so that an upper portion of the loop and a lower portion of the loop that travel in opposite directions are disposed in the track juxtaposed the roller assembly, a drive assembly operatively connected to the flexible drive member to drive the flexible drive member in the loop, a cinch mechanism mounted on the roller assembly for connecting the roller assembly to the flexible drive member selectively, the cinch mechanism having an upper clutch for engaging the upper portion of the flexible drive member to drive the side door in one direction, and the cinch mechanism having a lower clutch for engaging the lower portion of the flexible drive member to drive the side door in an opposite direction.

2. The drive mechanism as defined in claim 1 wherein each clutch includes a lariat having a noose at one end that tightens around the flexible drive member to connect the roller assembly to the flexible drive member.

3. The drive mechanism as defined in claim 1 wherein the cinch mechanism includes a drum and wherein each clutch includes a lariat having a noose at one end that tightens around the flexible drive member to connect to the roller assembly to the flexible drive member and an opposite end that is affixed to the drum.

4. The drive mechanism as defined in claim 3 wherein the noose of each clutch is located adjacent a stop for holding the flexible drive member outwardly when the noose is tightened around the flexible drive member.

5. The drive mechanism as defined in claim 4 wherein each stop is attached to the roller assembly.

6. The drive mechanism as defined in claim 1 wherein the cinch mechanism includes an indexable drum, wherein the upper clutch includes an upper lariat having an upper noose at one end that tightens around the upper portion of the flexible drive member to connect the roller assembly to the flexible drive member and an opposite upper end that is affixed to the drum, wherein the lower clutch includes a lower lariat having a lower noose at one end that tightens around the lower portion of the flexible drive member to connect the roller assembly to the flexible drive member and an opposite lower end that is affixed to the drum, the opposite upper end and the opposite lower end being attached to the indexable drum so that the upper noose is tightened when the drum is indexed in one direction and the lower noose is tightened when the drum is indexed in an opposite direction.

7. The drive mechanism as defined in claim 6 wherein the lower noose is loosened when the drum is indexed in the one direction and the upper noose is loosened when the drum is indexed in the opposite direction.

8. The drive mechanism as defined in claim 7 wherein the upper noose is located adjacent an upper stop for holding the upper portion of the flexible drive member outwardly when the upper noose is tightened around the upper portion of the flexible drive member and the lower is located adjacent a lower stop for holding the lower portion of the flexible drive member outwardly when the lower noose is tightened around the lower portion of the flexible drive member.

9. The drive mechanism as defined in claim 8 wherein the upper stop and the lower stop are attached to the roller assembly.

10. A drive mechanism for a power operated slideable side door that is attached to a roller assembly that travels in a track of a vehicle comprising:

a flexible drive cable trained to travel in a loop so that a first portion of the loop is disposed in the track juxtaposed the roller assembly to travel in a first direction and a second portion of the loop is disposed in the roller assembly to travel in an opposite direction, a drive assembly operatively connected to the flexible drive cable to drive the flexible drive cable in one direction, a cinch mechanism mounted on the hinge and roller assembly for connecting the roller assembly to the flexible drive cable selectively, and the cinch mechanism including a first clutch having a first noose that tightens around the upper portion of the flexible drive cable to connect the roller assembly to the flexible drive cable to drive the roller assembly in the first direction and a second clutch having a second noose that tightens around the lower portion of the flexible drive cable to connect and roller assembly to the flexible cable to drive the roller assembly in the opposite direction, the cinch mechanism further including a first stop for the first noose that is affixed to the roller assembly, and a second stop for the second noose that is affixed to the roller assembly, and a drum that is rotatably mounted on the roller assembly and operatively connected to the first noose and the second noose for tightening the first noose or the second noose around the flexible drive cable selectively.

11. A drive mechanism for a power operated slideable side door that is attached to a roller assembly that travels in a track of a vehicle comprising:

a flexible drive member that trained to travel in a loop so that a portion of the loop is disposed in the track juxtaposed the roller assembly, a drive assembly operatively connected to the flexible drive member to drive the flexible drive member, and a cinch mechanism mounted on the roller assembly for connecting the roller assembly to the flexible drive member selectively.

12. The drive mechanism as defined in claim 11 wherein the cinch mechanism includes a clutch that has a noose that tightens around the portion of the flexible drive member to connect the roller assembly to the flexible drive member to drive the roller assembly.

13. The drive mechanism as defined in claim 12 wherein the clutch has a lariat that has the noose at one end and an opposite end that is affixed to an indexable drum carried by the roller assembly.

14. The drive mechanism as defined in claim 13 wherein the cinch mechanism includes a stop for engaging the flexible drive member adjacent the portion that the noose tightens around.

15. The drive mechanism as defined in claim 11 wherein the flexible drive member is a round cable of uniform diameter.

16. The drive mechanism as defined in claim 15 wherein the round cable is endless.

* * * * *